United States Patent
Brewer et al.

(10) Patent No.: US 12,367,431 B2
(45) Date of Patent: *Jul. 22, 2025

(54) REAL-TIME CONTENT INTEGRATION BASED ON MACHINE LEARNED SELECTIONS

(71) Applicant: Snap Inc., Santa Monica, CA (US)

(72) Inventors: Jason Brewer, Mountain View, CA (US); Rodrigo B. Farnham, Los Angeles, CA (US); David B. Lue, Santa Monica, CA (US); Nicholas J. Stucky-Mack, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,433

(22) Filed: Apr. 25, 2024

(65) Prior Publication Data

US 2024/0275845 A1 Aug. 15, 2024

Related U.S. Application Data

(63) Continuation of application No. 18/099,087, filed on Jan. 19, 2023, now Pat. No. 12,003,577, which is a
(Continued)

(51) Int. Cl.
*G06N 20/20* (2019.01)
*G06N 7/01* (2023.01)
(Continued)

(52) U.S. Cl.
CPC .............. *G06N 20/20* (2019.01); *G06N 7/01* (2023.01); *G06N 20/00* (2019.01); *H04L 67/14* (2013.01); *H04L 67/535* (2022.05)

(58) Field of Classification Search
None
See application file for complete search history.

(56) References Cited

U.S. PATENT DOCUMENTS 8,499,040 B1 *  7/2013  Schoen .................. G06Q 10/10
                                                        709/204
8,744,987 B1 *  6/2014  Forman .................. G06N 20/00
                                                        706/20

(Continued)

OTHER PUBLICATIONS

"U.S. Appl. No. 18/099,087, Advisory Action mailed Nov. 16, 2023", 2 pgs.

(Continued)

*Primary Examiner* — Backhean Tiv
(74) *Attorney, Agent, or Firm* — SCHWEGMAN LUNDBERG & WOESSNER, P.A.

(57) ABSTRACT

A content request is received from a device of a user. A plurality of candidate content items is identified. Each candidate content item has a bid value. A relevancy value is automatically generated for each candidate content item. The relevancy value indicates whether the candidate content item is likely to be skipped by the user. For each candidate content item, a combined value is automatically generated by adjusting the bid value using the relevancy value generated for the candidate content item. One or more candidate content items are automatically selected based on the combined value generated for each of the one or more candidate content items. The one or more selected candidate content items are automatically integrated into at least one placeholder area among one or more pre-selected content items as part of the aggregated content. The aggregated content is presented on the device of the user.

20 Claims, 16 Drawing Sheets

Related U.S. Application Data continuation of application No. 17/321,711, filed on May 17, 2021, now Pat. No. 11,582,292, which is a continuation of application No. 16/749,961, filed on Jan. 22, 2020, now Pat. No. 11,025,705, which is a continuation of application No. 15/610,301, filed on May 31, 2017, now Pat. No. 10,581,953.

(51) Int. Cl.
*G06N 20/00* (2019.01)
*H04L 67/14* (2022.01)
*H04L 67/50* (2022.01)

(56) References Cited

U.S. PATENT DOCUMENTS

| | | | | |
|---|---|---|---|---|
| 8,762,575 B2* | 6/2014 | Brown | ............... | H04N 21/2668 709/217 |
| 8,874,144 B1* | 10/2014 | Liu | .................. | H04W 4/02 455/456.3 |
| 8,914,752 B1* | 12/2014 | Spiegel | ................ | G06F 3/0481 715/256 |
| 8,997,006 B2* | 3/2015 | Whitnah | ................ | G06Q 10/10 715/744 |
| 9,024,894 B1* | 5/2015 | Smith | .................. | G06F 3/0488 345/173 |
| 9,135,631 B2* | 9/2015 | Mitchell | ............... | H04L 67/535 |
| 9,294,425 B1* | 3/2016 | Son | .................... | H04L 51/18 |
| 9,324,095 B2* | 4/2016 | Singleton | ............ | G06Q 30/02 |
| 9,537,811 B2* | 1/2017 | Allen | .................. | H04L 51/42 |
| 9,659,218 B1* | 5/2017 | Shetty | ............. | H04N 21/23418 |
| 9,762,971 B1* | 9/2017 | Dodge | ............... | H04N 21/4532 |
| 10,191,927 B2* | 1/2019 | Marra | ............... | G06F 16/24578 |
| 10,200,485 B2* | 2/2019 | Marra | ............... | G06F 16/9535 |
| 10,244,290 B2* | 3/2019 | Kang | .................. | H04N 21/458 |
| 10,270,839 B2* | 4/2019 | Andreou | ................ | H04L 67/06 |
| 10,320,927 B2* | 6/2019 | Zheng | ................ | H04L 65/612 |
| 10,382,373 B1* | 8/2019 | Yang | ................. | G06F 16/5854 |
| 10,387,514 B1* | 8/2019 | Yang | .................. | H04L 51/52 |
| 10,491,694 B2* | 11/2019 | Liu | ..................... | H04L 67/306 |
| 10,581,953 B1* | 3/2020 | Brewer | .................. | H04L 67/14 |
| 10,699,216 B2* | 6/2020 | Dimson | ................ | G06Q 50/01 |
| 10,706,118 B1* | 7/2020 | Yang | ................. | H04N 21/4667 |
| 10,733,225 B1* | 8/2020 | Cook | ..................... | G06N 20/00 |
| 10,733,255 B1* | 8/2020 | Yang | ...................... | G06V 20/35 |
| 10,796,233 B2* | 10/2020 | Werris | .................. | H04L 67/306 |
| 10,817,791 B1* | 10/2020 | Shoemaker | ........... | G06F 21/316 |
| 10,866,719 B1* | 12/2020 | Bulusu | .................... | H04L 51/52 |
| 10,896,239 B1* | 1/2021 | Kim | .................. | G06Q 30/0269 |
| 10,902,341 B1* | 1/2021 | Qureshi | ................. | G06Q 10/10 |
| 11,025,705 B1* | 6/2021 | Brewer | ................... | H04L 67/535 |
| 11,064,011 B2* | 7/2021 | Andreou | .............. | G06F 3/04883 |
| 11,284,171 B1* | 3/2022 | Nair | .................. | H04N 21/25891 |
| 11,295,230 B2* | 4/2022 | Manikonda | .............. | G06N 7/01 |
| 11,582,292 B2* | 2/2023 | Brewer | .................. | H04L 67/535 |
| 2005/0234960 A1* | 10/2005 | Chickering | ............ | G06F 16/283 707/999.102 |
| 2006/0029646 A1* | 2/2006 | Vanderkooi | ............ | A23K 20/28 424/442 |
| 2006/0277098 A1* | 12/2006 | Chung | ................ | G06Q 30/0267 705/14.69 |
| 2008/0201225 A1* | 8/2008 | Maharajh | ............... | H04M 15/53 707/999.102 |
| 2009/0138339 A1* | 5/2009 | Moukas | ............. | G06Q 30/0255 705/7.12 |
| 2009/0287672 A1* | 11/2009 | Chakrabarti | .......... | G06Q 30/02 707/999.005 |
| 2010/0076850 A1* | 3/2010 | Parekh | ................. | G06Q 30/02 705/14.66 |
| 2010/0325737 A1* | 12/2010 | Fahn | ....................... | G06F 21/10 726/28 |
| 2011/0010245 A1* | 1/2011 | Priebatsch | ........ | G06Q 30/0261 705/14.58 |
| 2011/0029890 A1* | 2/2011 | Cosgrove | ........... | G06Q 20/4015 715/835 |
| 2011/0202409 A1* | 8/2011 | Chandrasekaran | ......................... | G06Q 30/0271 705/14.67 |
| 2013/0066715 A1* | 3/2013 | Umeda | ................... | G06Q 30/02 705/14.46 |
| 2013/0066716 A1* | 3/2013 | Chen | ....................... | G06Q 30/00 705/14.49 |
| 2013/0073568 A1* | 3/2013 | Federov | ............... | G06Q 30/0269 707/E17.069 |
| 2013/0080264 A1* | 3/2013 | Umeda | ................... | G06Q 30/02 705/14.69 |
| 2013/0085841 A1* | 4/2013 | Singleton | .......... | G06Q 30/0246 705/14.45 |
| 2013/0132194 A1* | 5/2013 | Rajaram | ................ | G06Q 50/01 706/12 |
| 2014/0012671 A1* | 1/2014 | Ye | ....................... | G06Q 30/0251 705/14.57 |
| 2014/0222819 A1* | 8/2014 | Dies | .................... | G06F 16/9535 707/740 |
| 2014/0273993 A1* | 9/2014 | Grappo | .................. | G06Q 30/00 455/414.1 |
| 2014/0278308 A1* | 9/2014 | Liu | ........................ | G06F 16/958 703/6 |
| 2014/0351852 A1* | 11/2014 | Brown | ............... | H04N 21/2668 725/34 |
| 2015/0093737 A1* | 4/2015 | Yun | ......................... | G06N 20/00 434/353 |
| 2015/0127418 A1* | 5/2015 | Piepgrass | .............. | G06Q 50/01 705/7.29 |
| 2015/0127591 A1* | 5/2015 | Gupta | ..................... | G06Q 50/01 706/12 |
| 2015/0156529 A1* | 6/2015 | Peterson | ............ | H04N 21/6582 725/12 |
| 2015/0301729 A1* | 10/2015 | Wang | ..................... | G06F 3/0485 715/707 |
| 2015/0317287 A1* | 11/2015 | Schacht | ................ | G06F 40/134 715/205 |
| 2016/0036896 A1* | 2/2016 | Spivey | .................... | H04L 67/55 709/204 |
| 2016/0099901 A1* | 4/2016 | Allen | ..................... | G06F 3/0482 709/206 |
| 2016/0147435 A1* | 5/2016 | Brody | .................. | G06F 3/04883 715/863 |
| 2016/0162503 A1* | 6/2016 | Yao | ...................... | G06F 16/9535 707/723 |
| 2016/0162802 A1* | 6/2016 | Chickering | ............ | G06N 20/00 706/12 |
| 2016/0171381 A1* | 6/2016 | Brewer | ................. | G06Q 50/01 706/11 |
| 2016/0171382 A1* | 6/2016 | Brewer | ............... | G06F 16/9535 706/11 |
| 2016/0189225 A1* | 6/2016 | Glover | .............. | G06F 16/24578 705/14.55 |
| 2016/0189234 A1* | 6/2016 | Tang | ................. | G06Q 30/0269 705/14.66 |
| 2016/0246806 A1* | 8/2016 | Bastide | ................ | G06F 40/166 |
| 2016/0266740 A1* | 9/2016 | Glasgow | ................ | G06F 16/71 |
| 2016/0283859 A1* | 9/2016 | Fenoglio | ................ | H04L 43/04 |
| 2016/0350953 A1* | 12/2016 | Mittelstaedt | .......... | H04L 51/043 |
| 2016/0358101 A1* | 12/2016 | Bowers | ................. | G06N 20/00 |
| 2016/0373397 A1* | 12/2016 | Kesten | .................. | H04L 67/53 |
| 2017/0053320 A1* | 2/2017 | Russek | ............... | H04N 21/25883 |
| 2017/0068964 A1* | 3/2017 | Gevka | ................ | G06Q 30/0277 |
| 2017/0103783 A1* | 4/2017 | Paglia | .................... | G11B 27/34 |
| 2017/0104802 A1* | 4/2017 | Chandran | ............. | H04L 67/567 |
| 2017/0142045 A1* | 5/2017 | Chakra | .................. | H04L 51/52 |
| 2017/0149852 A1* | 5/2017 | Selekman | ............. | H04L 67/535 |
| 2017/0161640 A1* | 6/2017 | Shamir | ................. | G06N 20/00 |
| 2017/0178023 A1* | 6/2017 | Green | ................ | G06F 16/9535 |
| 2017/0185254 A1* | 6/2017 | Zeng | ..................... | G06Q 10/101 |
| 2017/0185601 A1* | 6/2017 | Qin | ......................... | G06Q 50/01 |
| 2017/0186029 A1* | 6/2017 | Morris | .................... | G06Q 50/01 |
| 2017/0201779 A1* | 7/2017 | Publicover | ......... | H04N 21/4532 |
| 2017/0228114 A1* | 8/2017 | Brett | ................... | G06F 16/9535 |
| 2017/0243258 A1* | 8/2017 | Yang | .................. | G06Q 30/0276 |

(56) References Cited

U.S. PATENT DOCUMENTS

| | | | |
|---|---|---|---|
| 2017/0262139 A1* | 9/2017 | Patel | H04L 51/046 |
| 2017/0263029 A1* | 9/2017 | Yan | H04N 21/4312 |
| 2017/0270562 A1* | 9/2017 | Ben-Rubi | G06F 16/435 |
| 2017/0289234 A1* | 10/2017 | Andreou | H04L 51/10 |
| 2017/0308589 A1* | 10/2017 | Liu | G06F 16/9535 |
| 2017/0344246 A1* | 11/2017 | Burfitt | G06Q 10/10 |
| 2017/0353416 A1* | 12/2017 | Brooks | H04L 51/04 |
| 2018/0063198 A1* | 3/2018 | Anders | G06N 20/00 |
| 2018/0115622 A1* | 4/2018 | Zheng | H04L 51/10 |
| 2018/0124300 A1* | 5/2018 | Brook | H04N 23/62 |
| 2018/0139166 A1* | 5/2018 | Dimson | G06F 16/435 |
| 2018/0139293 A1* | 5/2018 | Dimson | H04L 51/214 |
| 2018/0143748 A1* | 5/2018 | Ahmed | H04N 21/4622 |
| 2018/0150465 A1* | 5/2018 | Brownhill | H04L 67/52 |
| 2018/0150878 A1* | 5/2018 | Mowatt | G06Q 30/0259 |
| 2018/0174190 A1* | 6/2018 | Ferreira | G06Q 50/01 |
| 2018/0188916 A1* | 7/2018 | Lyons | G06F 16/435 |
| 2018/0189074 A1* | 7/2018 | Kulkarni | G06F 9/451 |
| 2018/0189668 A1* | 7/2018 | Ray | G06N 20/20 |
| 2018/0225725 A1* | 8/2018 | Paul | H04N 21/812 |
| 2018/0241871 A1* | 8/2018 | Sarafa | H04L 51/212 |
| 2018/0253193 A1* | 9/2018 | Zeng | G06Q 10/10 |
| 2018/0268073 A1* | 9/2018 | Wang | G06F 16/9535 |
| 2018/0268303 A1* | 9/2018 | Arora | G06Q 30/0277 |
| 2018/0315076 A1* | 11/2018 | Andreou | G06Q 30/0241 |
| 2018/0341877 A1* | 11/2018 | Panattoni | G06N 5/025 |
| 2019/0005419 A1* | 1/2019 | Howard | G06F 16/125 |
| 2019/0147112 A1* | 5/2019 | Gordon | G06N 20/00 706/12 |
| 2019/0205918 A1* | 7/2019 | Kim | G06Q 30/0243 |
| 2019/0354344 A1* | 11/2019 | Chen | G10L 15/08 |
| 2021/0281632 A1* | 9/2021 | Brewer | G06N 5/01 |
| 2023/0139728 A1* | 5/2023 | DiMaria | G06N 20/00 379/209.01 |
| 2023/0156075 A1* | 5/2023 | Brewer | H04L 67/10 709/219 |
| 2024/0275845 A1* | 8/2024 | Brewer | H04L 67/306 |

OTHER PUBLICATIONS

"U.S. Appl. No. 18/099,087, Final Office Action mailed Sep. 8, 2023", 17 pgs.

"U.S. Appl. No. 18/099,087, Non Final Office Action mailed Jun. 2, 2023", 33 pgs.

"U.S. Appl. No. 18/099,087, Notice of Allowance mailed Jan. 31, 2024", 21 pgs.

"U.S. Appl. No. 18/099,087, Response filed Aug. 18, 2023 to Non Final Office Action mailed Jun. 2, 2023", 12 pgs.

"U.S. Appl. No. 18/099,087, Response filed Nov. 7, 2023 to Final Office Action mailed Sep. 8, 2023", 9 pgs.

"U.S. Appl. No. 18/099,087, Response filed Nov. 28, 2023 to Advisory Action mailed Nov. 16, 2023", 9 pgs.

U.S. Appl. No. 15/610,301 U.S. Pat. No. 10,581,953, filed May 31, 2017, Real-Time Content Integration Based on Machine Learned Selections.

U.S. Appl. No. 16/749,961 U.S. Pat. No. 11,025,705, filed Jan. 22, 2020, Real-Time Content Integration Based on Machine Learned Selections.

U.S. Appl. No. 17/321,711 U.S. Pat. No. 11,582,292, filed May 17, 2021, Real-Time Content Integration Based on Machine Learned Selections.

U.S. Appl. No. 18/099,087 U.S. Pat. No. 12,003,557, filed Jan. 19, 2023, Real-Time Content Integration Based on Machine Learned Selections.

\* cited by examiner

REAL-TIME CONTENT INTEGRATION BASED ON MACHINE LEARNED SELECTIONS

PRIORITY CLAIM

This application is a continuation of and claims the benefit of priority of U.S. patent application Ser. No. 18/099,087, filed Jan. 19, 2023, which is a continuation of and claims the benefit of priority of U.S. patent application Ser. No. 17/321,711, filed May 17, 2021, which is a continuation of and claims the benefit of priority of U.S. patent application Ser. No. 16/749,961, filed Jan. 22, 2020, which is a continuation of and claims the benefit of priority of U.S. patent application Ser. No. 15/610,301, filed May 31, 2017, each of which are hereby incorporated by reference herein in their entireties.

BACKGROUND

Users can execute applications on their mobile client devices to receive posts and collections of content published by other users. For example, a user may browse content within an application and select a content item (e.g., slideshow, article) for viewing. When the content is requested, the server handling the request must assemble the content, some of which may be provided by third parties, on-the-fly and send the assembled content to the user before the user notices a delay. The limited amount of time and limited network bandwidth constrain how content is selected for display.

BRIEF DESCRIPTION OF THE SEVERAL VIEWS OF THE DRAWINGS

To easily identify the discussion of any particular element or act, the most significant digit or digits in a reference number refer to the figure (FIG.) number in which that element is first introduced.

DETAILED DESCRIPTION

Figure 1:
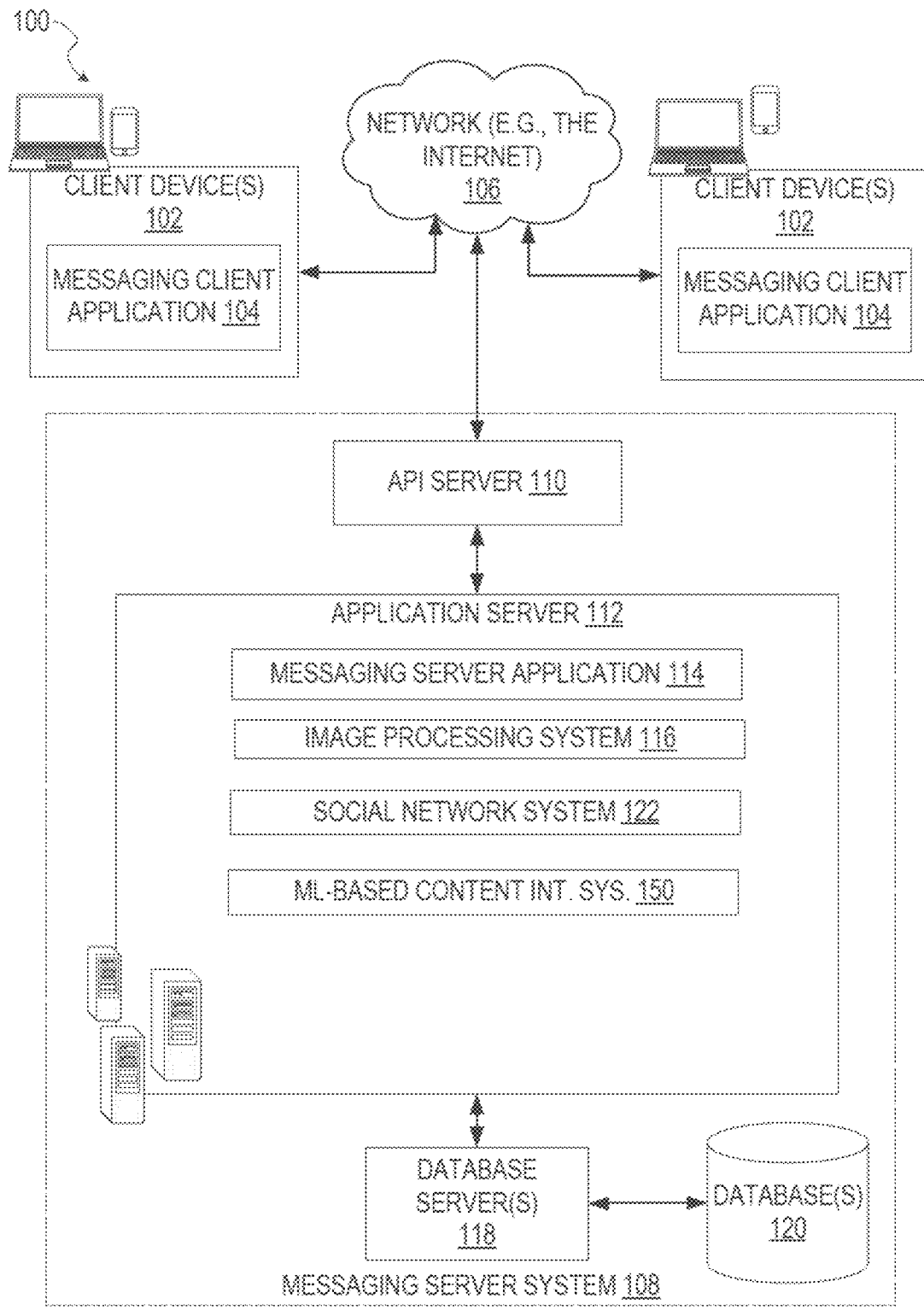
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Assembling relevant content (e.g., movie trailers, concert notifications, slideshows, articles) for a user to browse over a network is challenging because the content may be in a form difficult to integrate in response to on-the-fly user requests. For example, a movie studio may release a trailer to an upcoming movie and try to distribute the trailer for user viewing. One approach to distributing the movie trailer would be to select a number of websites and/or web pages, publish the trailer to those sites/pages, and hope that relevant users watch the trailer. However, such an approach may lead to poorly designed sites/pages full of content not specific to a given user. Users that become annoyed with the irrelevant content may opt to avoid the site or page altogether, thereby causing the network site or application to lose viewers, users, and/or subscribers.

The problem of irrelevant content is further exacerbated because often content must be selected very quickly in response to a user requesting a given page. For example, a web page may have a set-aside canvas area specially configured to display movie trailers. Modernly, the process of selecting which movie trailer to put in the canvas area is not performed until a user lands on the page. However, a given user may only stay on the page for a couple of seconds. Thus, the time to receive a request for content, select the content from available content, integrate the content into the page, and transmit the content to the user as part of the page must occur so fast so that (1) the user does not experience delay (e.g., page freeze, taking more than one second for a page to load), and/or (2) the user is still on the page when the selected content is displayed. Obviously, if a content selection process is too slow and the user navigates to another page, then the content selection process is useless. Conventionally, to handle the lack-of-time issue, content may be selected far before the user requests the content (e.g., as is the case in conventional newspapers). However, as discussed above, that approach creates the issue of irrelevant content in an online environment where users can easily navigate away from pages/applications bloated with irrelevant content. As is evident, the problem of selecting and integrating relevant content in a way that creates a good user experience is difficult.

A content integration system can implement a machine learning classifier trained on past historical user data to generate relevancy numbers that predict how relevant each available piece of content is to the specific user that initiated the request. That is, a given user is paired with each piece of content to generate the relevancy numbers using the machine classifier. In some example embodiments, the content item having the highest relevancy number can be used to automatically select for integration and transmission to the user in real time (e.g., within a current session, while the user is on the page, within 200 milliseconds).

In some example embodiments, when a user requests an aggregation of content such as an ephemeral message story, as discussed in further detail below with reference to FIG. 5, the high-speed selection process is triggered. The selection processes uses a machine learning classifier (e.g., random forest) to generate the relevancy values for each of the available online content items. The machine learning classifier can be trained on past historical data of users. The past historical user data can include user characteristics, user browse data, subscription data, and other past user data.

The relevancy value can be generated from a swipe value and a bypass value, according to some example embodiments. In some example embodiments, the swipe value and the bypass value are added together to generate the relevancy value. The swipe value is the likelihood that the user that generated the request will use a swipe gesture on a piece of a given online content item, where a swipe gesture indicates that the user wants to further examine the piece of content. The bypass value is the likelihood that the user that generated the request will use a tap gesture on a piece of given content to skip the content and view other content. The machine learning classifier can take into account the characteristics of the user (e.g., preferences, likes, subscriptions to types of ephemeral stories) to generate the swipe value and the bypass value for each of the available online content items. The machine learning classifier can further take into account the user's browse path that led him/her to the page that initiated the request.

In some example embodiments, once each piece of online content has received a swipe value and bypass value, the online content item having the highest combination of swipe and bypass values (e.g., the highest relevancy value) is selected for transmission to the user. In some example embodiments, the entire process of generating a swipe and bypass values and transmitting the selected online content item to the user occurs while the user is on the page that initiated the request (e.g., during the current active user session). In some example embodiments, an aggregation of content (e.g., an ephemeral message story) that includes the selected item content is generated on-the-fly in response to the user requesting the aggregated content. Because of how the content integration system is configured, the entire processes of selection and transmission of content can be performed without noticeable delay (e.g., within 200 milliseconds of the request being generated).

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include: message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of a list of friends of a user of a client device 102; the retrieval of such collections; the retrieval of messages and content; the adding and deletion of friends to a social graph; the location of friends within a social graph; opening an application event (e.g., relating to the messaging client application 104).

The application server 112 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking network services, and makes these functions and services available to the messaging server application 114. To this end, the social network system 122 maintains and accesses an entity graph 304 (FIG. 3) within the database 120. Examples of functions and services supported by the social network system 122 include the identification of other users of the messaging system 100 with which a particular user has relationships or is "following", and also the identification of other entities and interests of a particular user.

As illustrated, the application server 112 also includes a machine-learning (ML)-based content integration system 150, according to some example embodiments. The ML-based content integration system 150 is configured to generate relevancy scores that describe the estimated organic value (EOV) of available content items (e.g., movie trailers, concert notifications) to a given user. In some example embodiments, the relevancy scores include a select value and a bypass value that are generated by a machine learning classifier (e.g., random forest) that has been trained on historical user data and content data. Further details of the ML-based content integration system 150 are discussed below with reference to FIGS. 6-12.

The application server 112 is communicatively coupled to a database server 118, which facilitates access to a database 120 in which is stored data associated with messages processed by the messaging server application 114.

Figure 2:
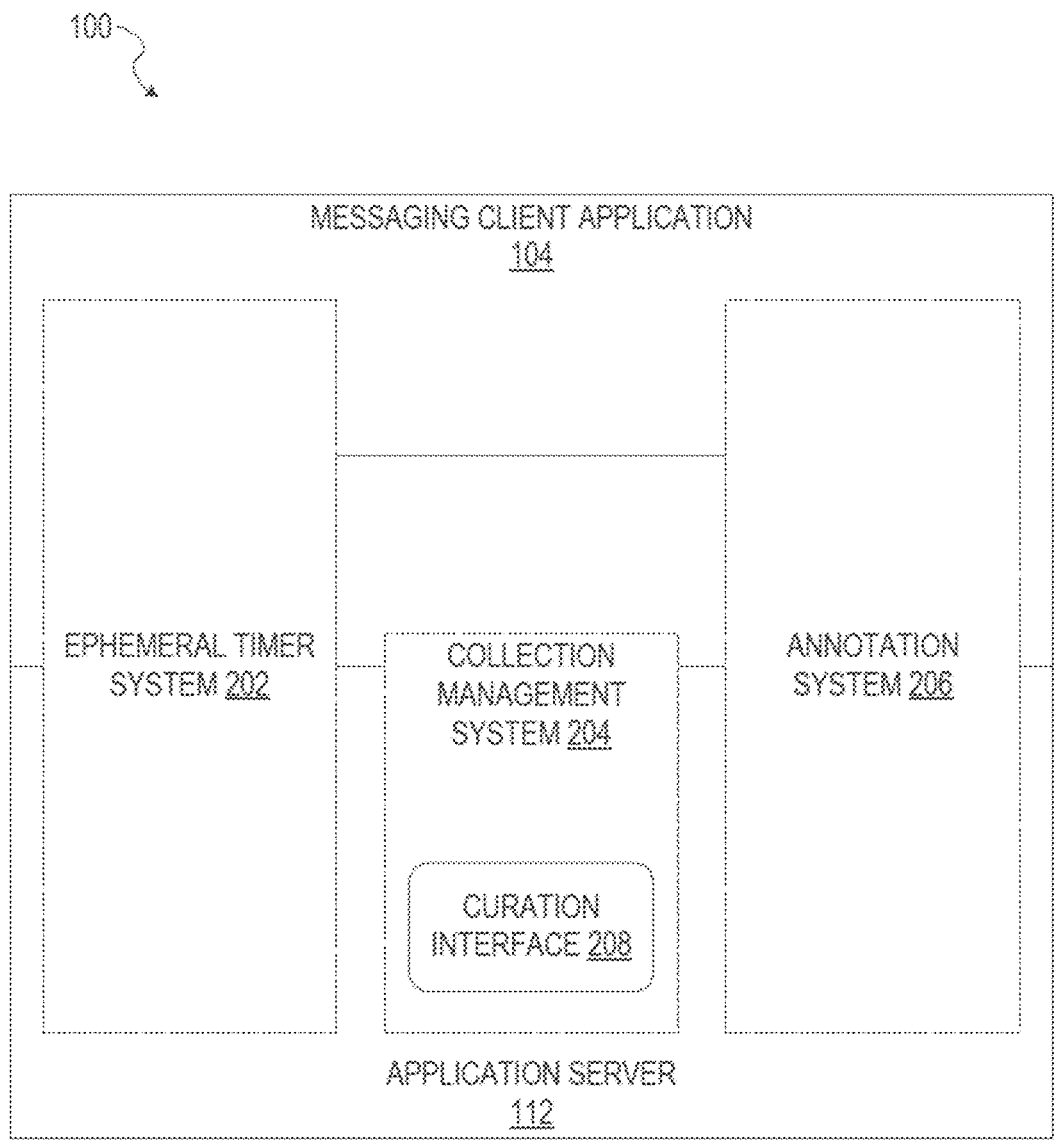
FIG. 2 is block diagram illustrating further details regarding a messaging server system, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay can include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time. In some example embodiments, the machine-learning-generated relevancy values (e.g., EOV values) are added to a merchant's bid to boost or attenuate the merchant's bid based upon whether the relevancy value is negative or positive for a given content item and user pair, where the user is the user that initiated a request for content, for example by requesting a live story.

Figure 3:
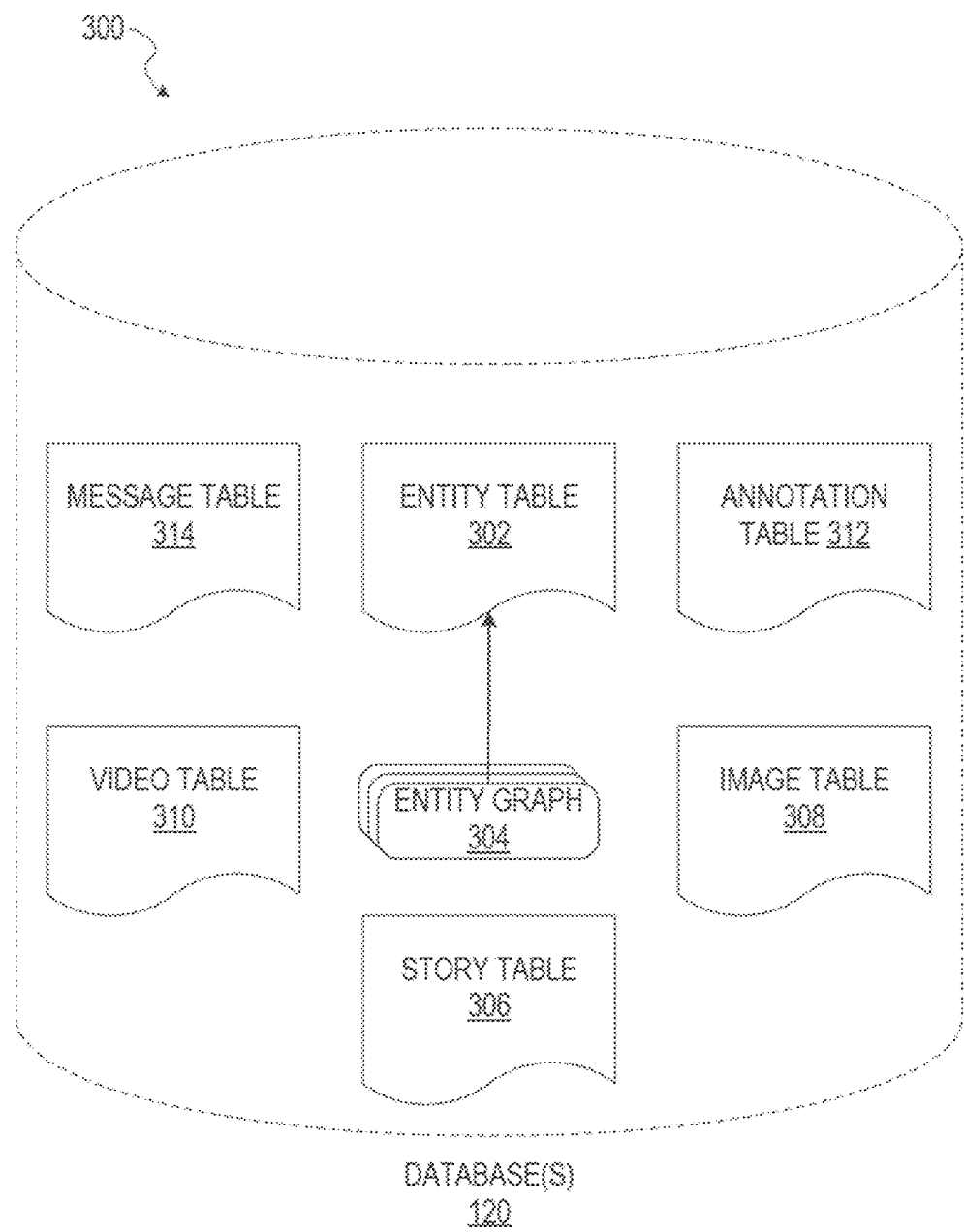
FIG. 3 is a schematic diagram illustrating data which may be stored in the database of the messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filers include geolocation filters (also known as geo-filters), which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
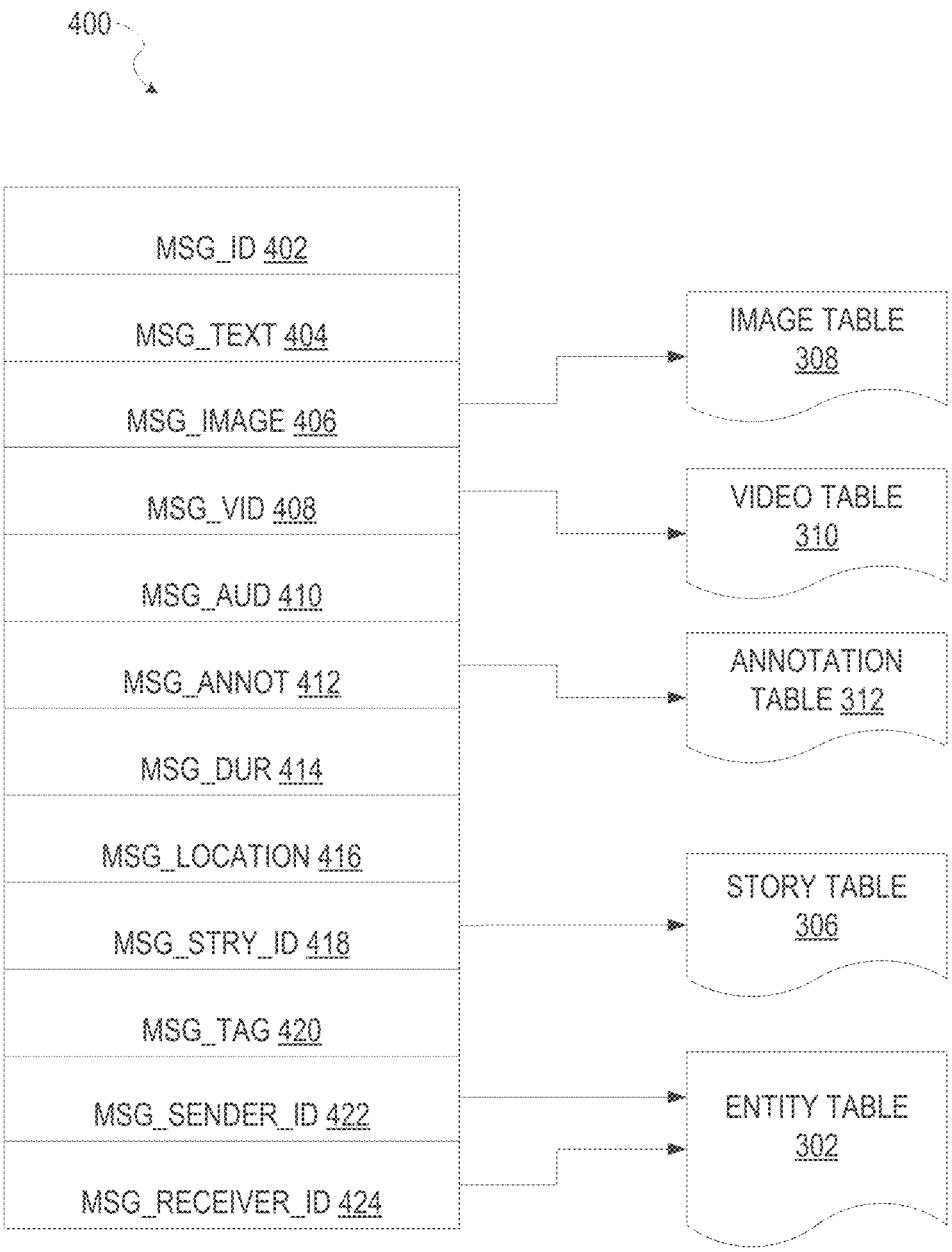
FIG. 4 is a schematic diagram illustrating a structure of a message, according to some embodiments, generated by a messaging client application for communication.

FIG. 4 is a schematic diagram illustrating a structure of a message 400, according to example embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text to be generated by a user via a user interface of the client device 102 and that is included in the message 400.

A message image payload 406: image data captured by a camera component of a client device 102 or retrieved from memory of a client device 102 and that is included in the message 400.

A message video payload 408: video data captured by a camera component or retrieved from a memory component of the client device 102 and that is included in the message 400.

A message audio payload 410: audio data captured by a microphone or retrieved from the memory component of the client device 102 and that is included in the message 400.

Message annotations 412: annotation data (e.g., filters, stickers, or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
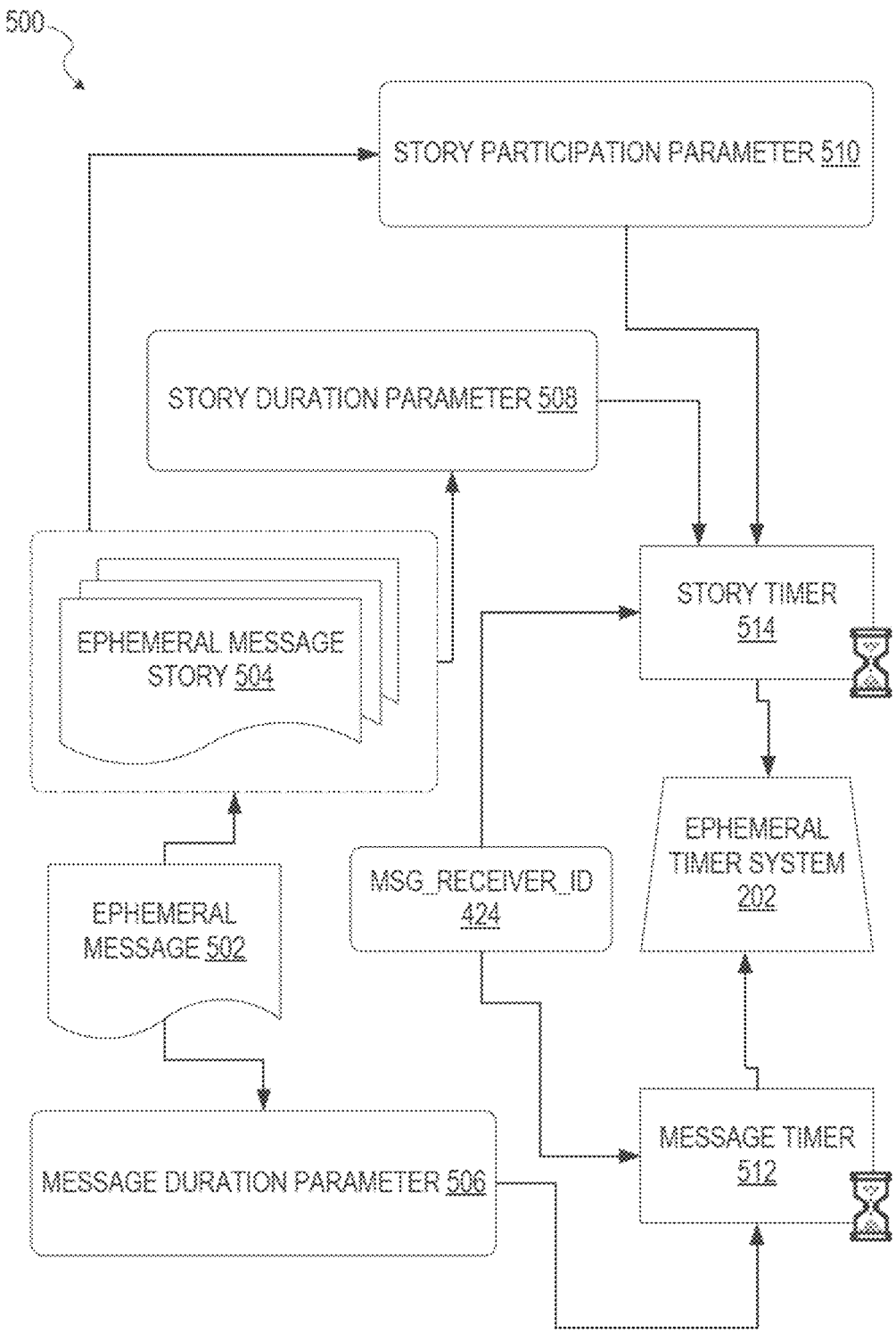
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
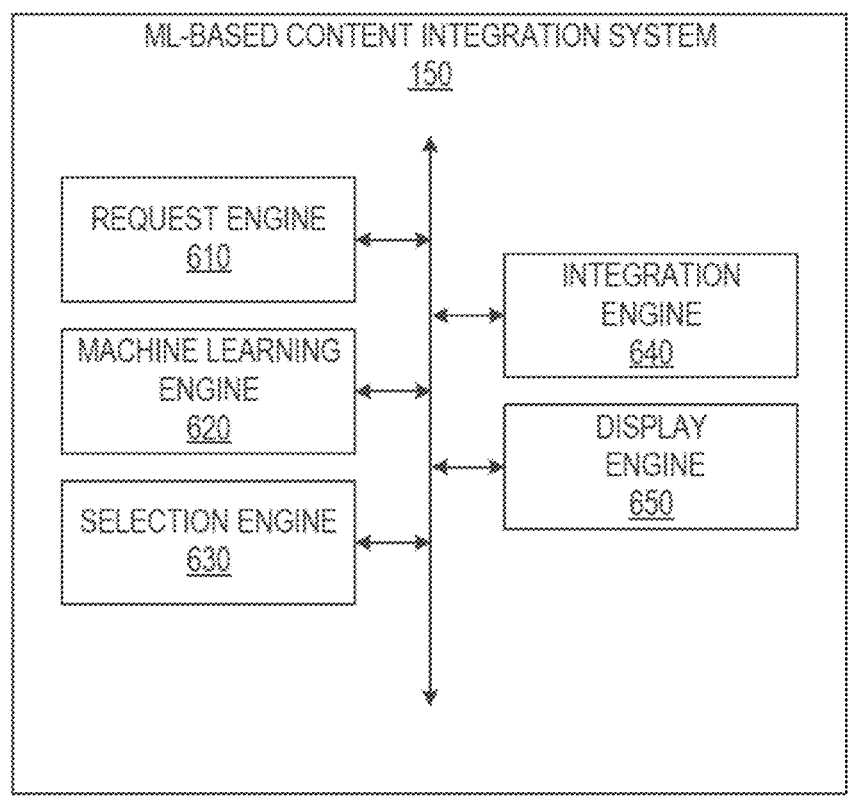
FIG. 6 displays example architecture of a machine learning (ML) based integration engine, according to some example embodiments.

FIG. 6 shows a functional architecture for a machine learning (ML)-based content integration system 150, according to some example embodiments. As illustrated, the ML-based content integration system 150 comprises a request engine 610, a machine learning engine 620, a selection engine 630, an integration engine 640, and a display engine 650. The request engine 610 is configured to receive requests for online content. For example, the request engine may receive a request for a content collection which has place holder spots in which selected content can be integrated. The machine learning engine 620 is configured to automatically generate relevancy values using a model machine learned from user data. The selection engine 630 is configured to select one or more items of content using the relevancy values. The integration engine 640 is configured to prepare selected content for transmission to the user. For example, the selection engine 630 may integrate the selected content into a requested content collection. The display engine 650 is configured to transmit a presentation (e.g., layout code) of the content collection to the user that requested the content collection in an active session without noticeable delay.

Figure 7:
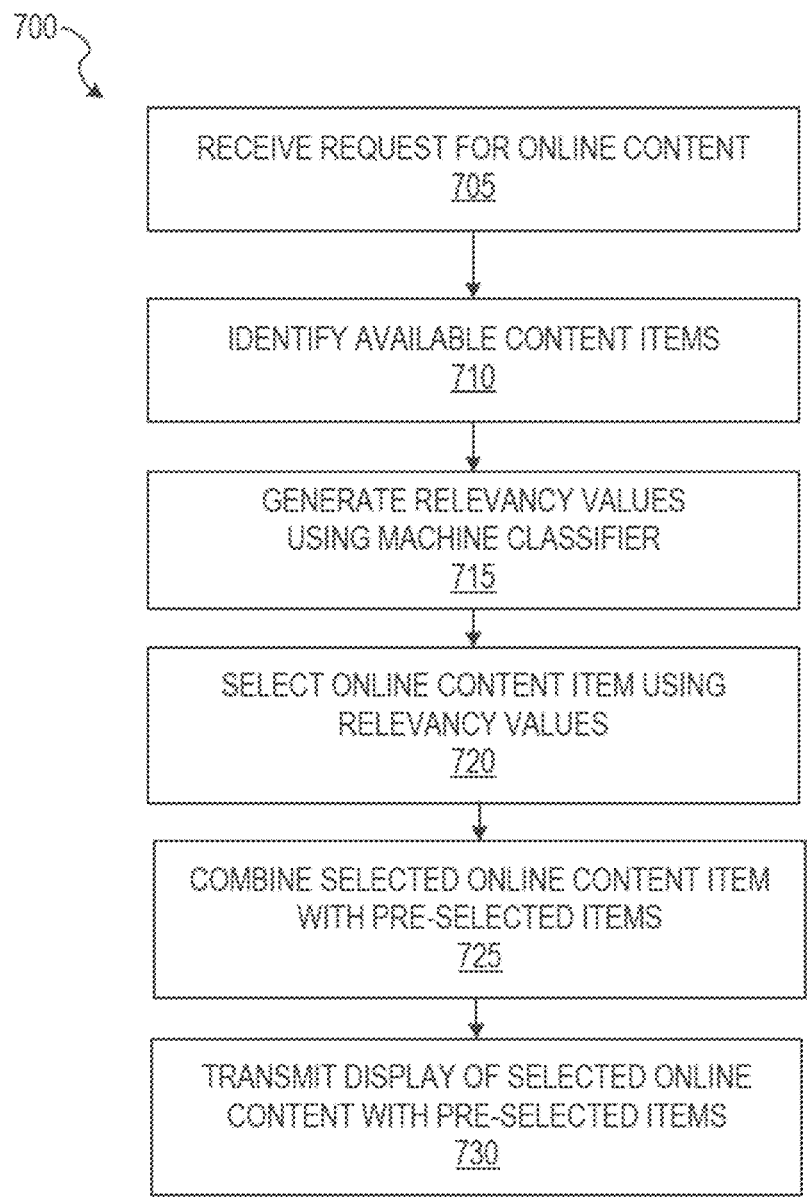
FIG. 7 shows a flow diagram of a method for integrating machine selected content, according to some example embodiments.

FIG. 7 shows a flow diagram of a method 700 for integrating machine selected content, according to some example embodiments. At operation 705, the request engine 610 receives a request for online content. For example, the request may be initiated in response to a user requesting a content collection, such as an ephemeral message story 504. At operation 710, the machine learning engine 620 identifies available content items. The available content items may have been submitted by third parties (e.g., movie studios) and stored in a database for later integration into content collections. At operation 715, the machine learning engine 620 generates relevancy values. For example, the machine learning engine 620 may apply its trained model (e.g., trained random forest) on each item of available content to produce a swipe value and a bypass value for each item of available content.

At operation 720, the selection engine 630 selects a particular online content item using the relevancy values. In some example embodiments, the selection engine 630 selects the online content item having the highest relevancy value for a given user. At operation 725, the integration engine 640 integrates the selected content item with items that have been pre-selected for display. For example, a given content collection may be a slideshow in which each slide is an ephemeral message (e.g., ephemeral message 502). The ephemeral messages may be pre-selected and compiled into a content collection using the curation interface 208 as discussed above, with reference to FIG. 2. The content collection may have placeholder areas between two ephemeral messages that can be used to insert on-the-fly content (e.g., a movie trailer having high relevancy scores). In some example embodiments, a content collection is published with multiple pre-selected ephemeral messages and blank placeholder spots that can be filled with on-the-fly content upon the content selection being requested. At operation 730, the display engine 650 transmits a display of the requested content collection.

Figure 8:
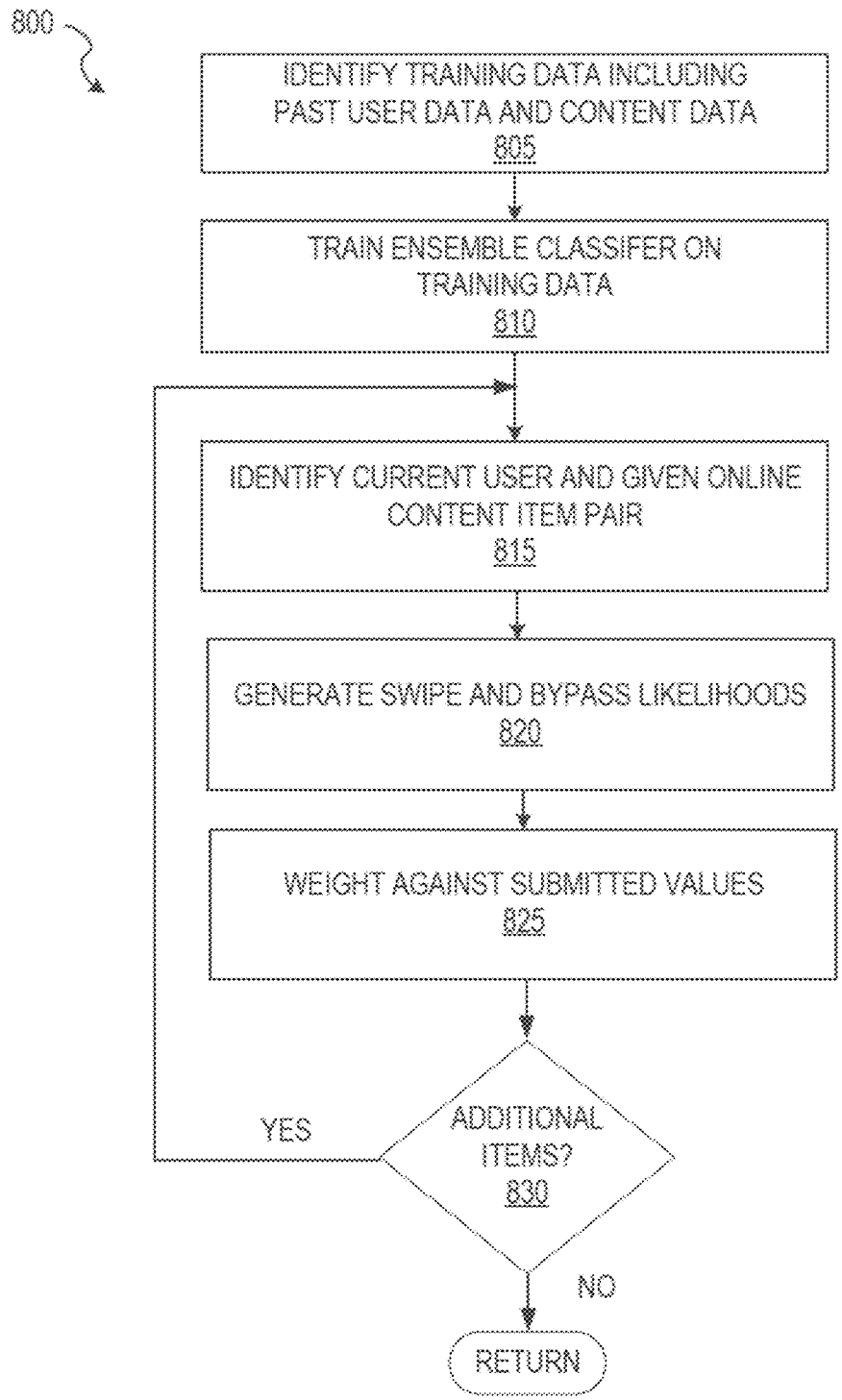
FIG. 8 shows a flow diagram of a method for training a machine classifier to generate offset values, according to some example embodiments.

FIG. 8 shows a flow diagram of a method 800 for training a machine classifier to generate offset values, according to some example embodiments. The operations of FIG. 8 may be performed as a sub-routine to operation 715, according to some example embodiments. At operation 805, the machine learning engine 620 identifies training data that includes historical user data and historical content data. In some example embodiments, the historical user data includes subscriptions to content collections of a given publisher, categorical affinity preferences (e.g., preference for car related content, preference for cosmetics-related content, preference for American politics-related content), the period of time a given user spends viewing a content item, the user logging out after viewing a content item, the user exiting the viewing of a content collection stream (e.g., terminating an ephemeral message story to return to the home page of the app), whether or not a given user installed an app (e.g., on his/her client device 102) advertised by a given content item, preferences saved in user profiles (e.g., user profile of the social networking service such as ad opt-out settings), whether or not the given user shared the content item after viewing it. The historical content data in the training data includes content items that have been displayed to the past users. The content items may be described by metadata that describes what content category a given item of content belongs to (e.g., car related, cosmetics related, American politics related), the type or medium of the given content item (e.g., ephemeral message, video clip, static image), whether the given content item has links to other network pages/websites, whether the content item invokes an operating system call to another application installed on client device 102 (e.g., a content item that invokes an App Store call on iOS to show a specific app for install), whether the content is similar to the pre-selected content of a content collection. Further, the training data may include information specifying whether a given past user selected or bypassed a displayed content item.

At operation 810, the machine learning engine 620 trains a machine learning classifier, such as an ensemble classifier, on the training data. For example, the machine learning engine 620 may train a random forest on the training data. The random forest is a collection of decision trees that are trained on random subsets of the training data (e.g., the historical user data and historical content data) so as to avoid over-fitting of the decision trees. The results of the decision trees can generate a probability, "p[swipe]", of a given user selecting a given content item and a probability of a given user skipping the given content, "p[skip]", in a voting scheme. For example, assume a given user described by the historical user data above and given a content item described by the historical content data above. If there are ten trees, seven may generate a result that the given user will select (e.g., swipe) the content, while three may predict that the given user will bypass (e.g., tap) on the content. In that example, p[swipe]=70% (from 7/10) and p[skip]=30% (from 3/10). In some example embodiments, hundreds of trees may be used in place of ten for a more robust result. Although swipe and skipping are discussed here as an example, one of ordinary skill in the art appreciates that other user inputs (e.g., clicking "watch movie trailer" or "skip movie trailer") can likewise be implemented in the machine learning approach.

At operation 815, the machine learning engine 620 identifies a current user and a given online item content pair. For example, the current user may be a user that requested a content collection. Further, the given online content item pair may be one of a plurality of content items available for integration into the content collection. At operation 820, the machine learning engine 620 implements the trained machine classifier to generate the relevancy values (e.g., the select likelihood "p[swipe]", and the "p[skip]" bypass likelihood).

At operation 825, the machine learning engine 620 weights the relevancy values against values received from the submitters of the online content items, according to some example embodiments. The values received from the respective submitters of the online content items are bids in a currency format (e.g., $0.50). For example, a first submitter may be movie studio "ACME" that submits a movie trailer with a cost-per-click bid of $0.50, whereas a second submitter may be another movie studio "XYZ" that submits another movie trailer with a cost-per-click bid of $0.75. In some example embodiments, the relevancy values are used to weight the bids (e.g., numerical values received from the online content creators) as follows: final_value=submitted_value+normalized_relevancy_value. The final_value and the submitted_value are numbers in currency format. The submitted_value is the value received from the creator of the content (e.g., a bid in currency format). The normalized relevancy value is generated by normalizing the relevancy values to currency format as follows: normalized_relevancy_value=(w_swipe*p[swipe])+(w_skip*p[skip]), where w_swipe and w_skip are coefficients that are multiplied against the respective probabilities. One of the results of weighting the bids with the machine generated values is that content that was has a lower bid (e.g., the movie from ACME) may be boosted based on the random forest indicating that a given user may favor the content and select it, thereby ensuring a favorable user experience.

In some example embodiments, the machine learning engine 620 generates w_swipe and w_skip coefficients by analyzing the empirical distribution of the generated "p[swipe]" "p[skip]" likelihoods and solving the system of equations w_swipe and w_skip such that:

$$\text{submitted\_value} * 0.20 = \text{normalized\_relevancy\_value; and}$$

$$|\text{w\_swipe}| = 10 \times |\text{w\_skip}|.$$

In this way, w_swipe and w_skip are generally set so that the normalized relevancy value is −20% of the submitted value. Generally, for most items of content, the resulting normalized relevancy value is negative due to most users historically choosing to skip content (or not select the content). However, for some items of content, the normalized relevancy value may be positive where the content has a low skip rate and high swipe rate.

At operation 830, the machine learning engine 620 determines whether there are additional content items that have not received relevancy values or weighted relevancy values (e.g., boosted/attenuated bids). If there are additional items of content, the method 800 may loop back to operation 815 where the next item of content (e.g., the "given" item of content for that iteration) is identified with the current user as a pair for analysis. Likewise, operations 820 and 825 may similarly be performed for the next item of content. If there are no more additional items (e.g., if all items have received relevancy values for a current user), then at operation 830 the machine learning engine 620 terminates and returns to method 700 for further processing as discussed above.

Figure 9:
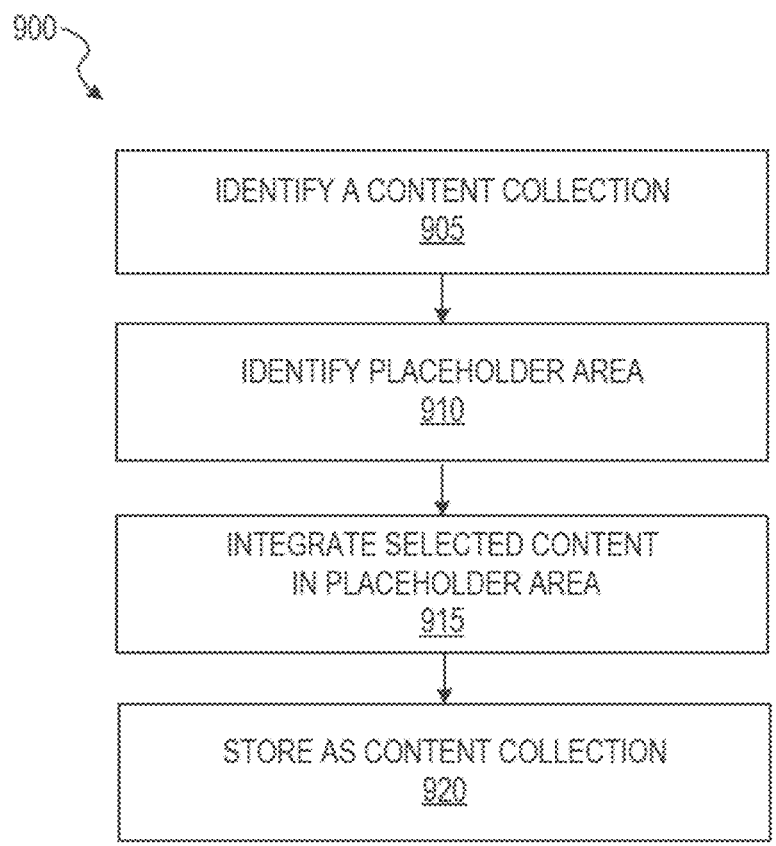
FIG. 9 shows a flow diagram of a method of generating combined content, according to some example embodiments.

FIG. 9 shows a flow diagram of a method 900 of generating a content collection, according to some example embodiments. At operation 905, the integration engine 640 identifies a content collection including pre-selected content and one or more placeholder areas. The pre-selected content may include ephemeral messages selected using the curation interface 208. At operation 910, the integration engine 640 identifies a placeholder area within the content collection. As mentioned above, the placeholder areas are blank areas designated to receive on-the-fly content responsive to a request for a content collection. At operation 915, the integration engine 640 embeds the online content selected at operation 720 into the placeholder area. At operation 920, the integration engine 640 stores the content collection having the selected integrated content to memory.

Figure 10:
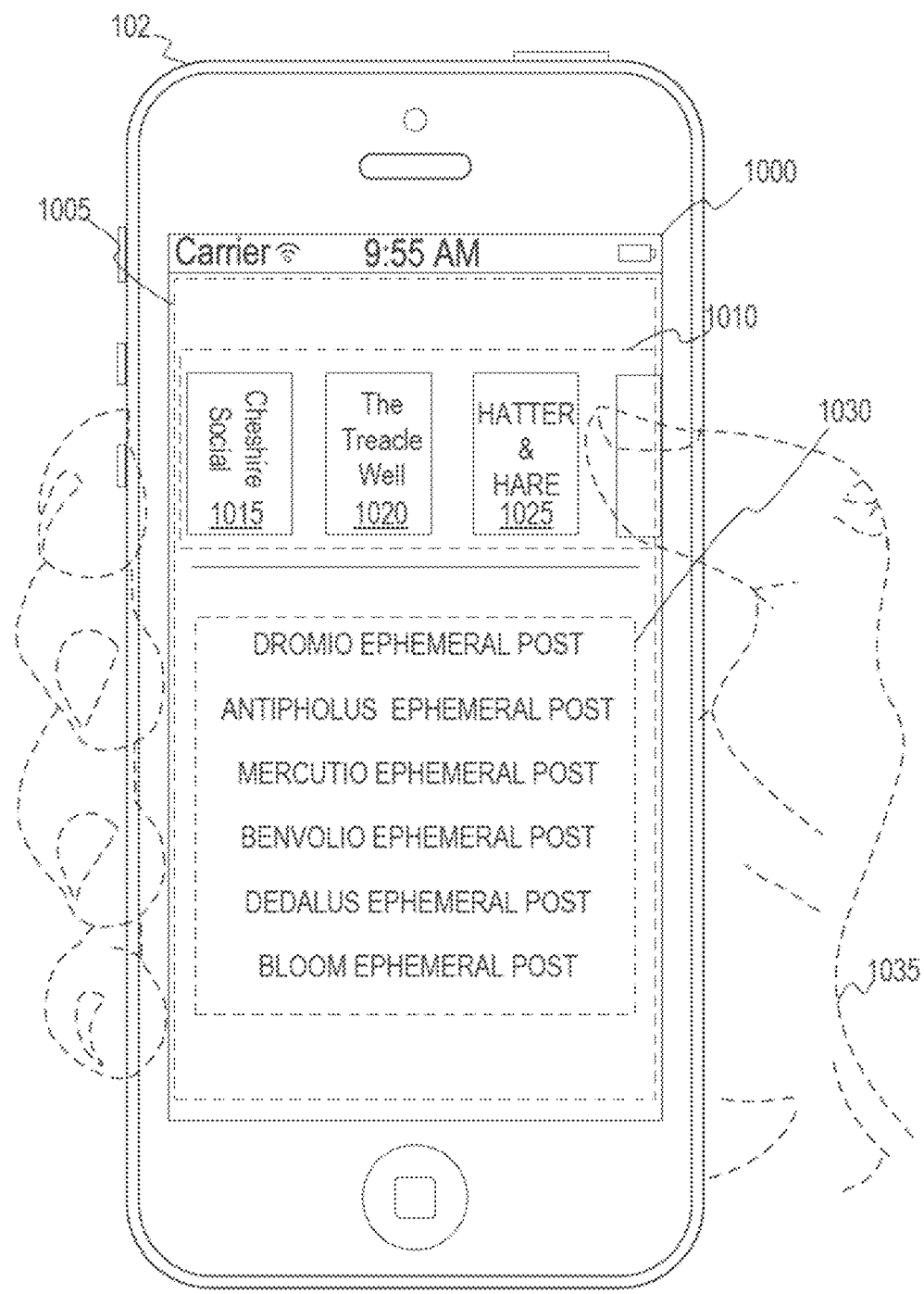
FIG. 10 shows an application for generating a request, according to some example embodiments.

FIG. 10 shows an application 1005 for generating a request, according to some example embodiments. As illustrated, the client device 102 has a display device 1000 that shows the executing application 1005. The application 1005 displays posts 1030 (e.g., ephemeral message 502) published to the application server 112. In a collected content area 1010, several icons link to respective content collections, including a first content collection 1015, a second content collection 1020, and a third content collection 1025. A user 1035 can interact with the application 1005 through the display device 1000 through one or more user interactions (e.g., clicks, taps, swipes, tap-and-hold).

Figure 11A:
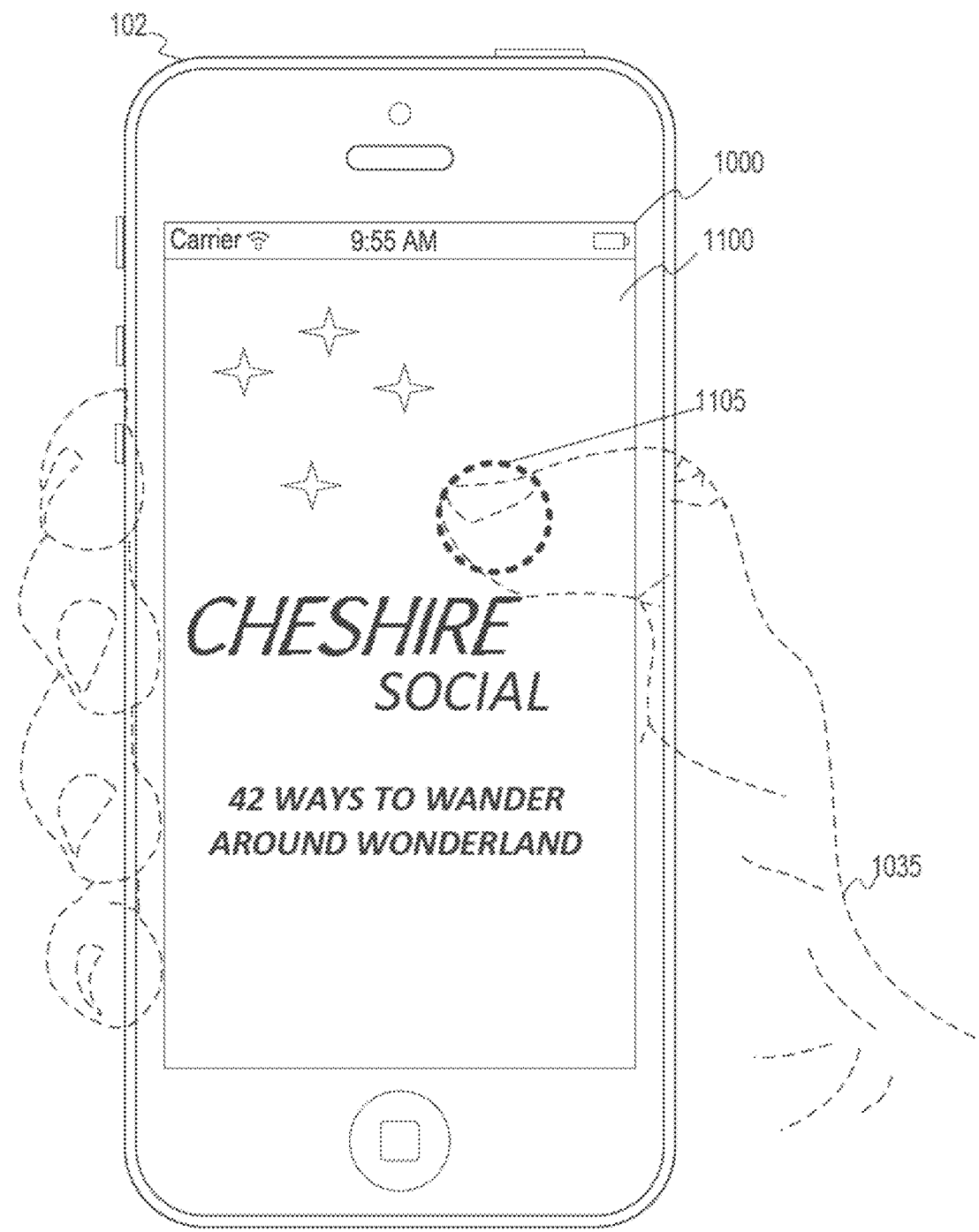
FIGS. 11A-C show examples of different items in a content collection, according to some example embodiments.

FIG. 11A shows the result of the user 1035 tapping on the icon of content collection 1015. Responsive to the user 1035 tapping on the icon of content collection 1015, the request engine 610 sends a request to the application server 112 requesting the content collection 1015. The request triggers the methods 700, 800, and 900 discussed above. The resulting content collection (now having the selected content integrated into a placeholder area) is returned to client device 102 and displayed on display device 1000. FIG. 11A shows an example title page 1100 of the collected content. The user may navigate to the next page by performing a tap gesture as indicted by dotted circle 1105.

Figure 11B:
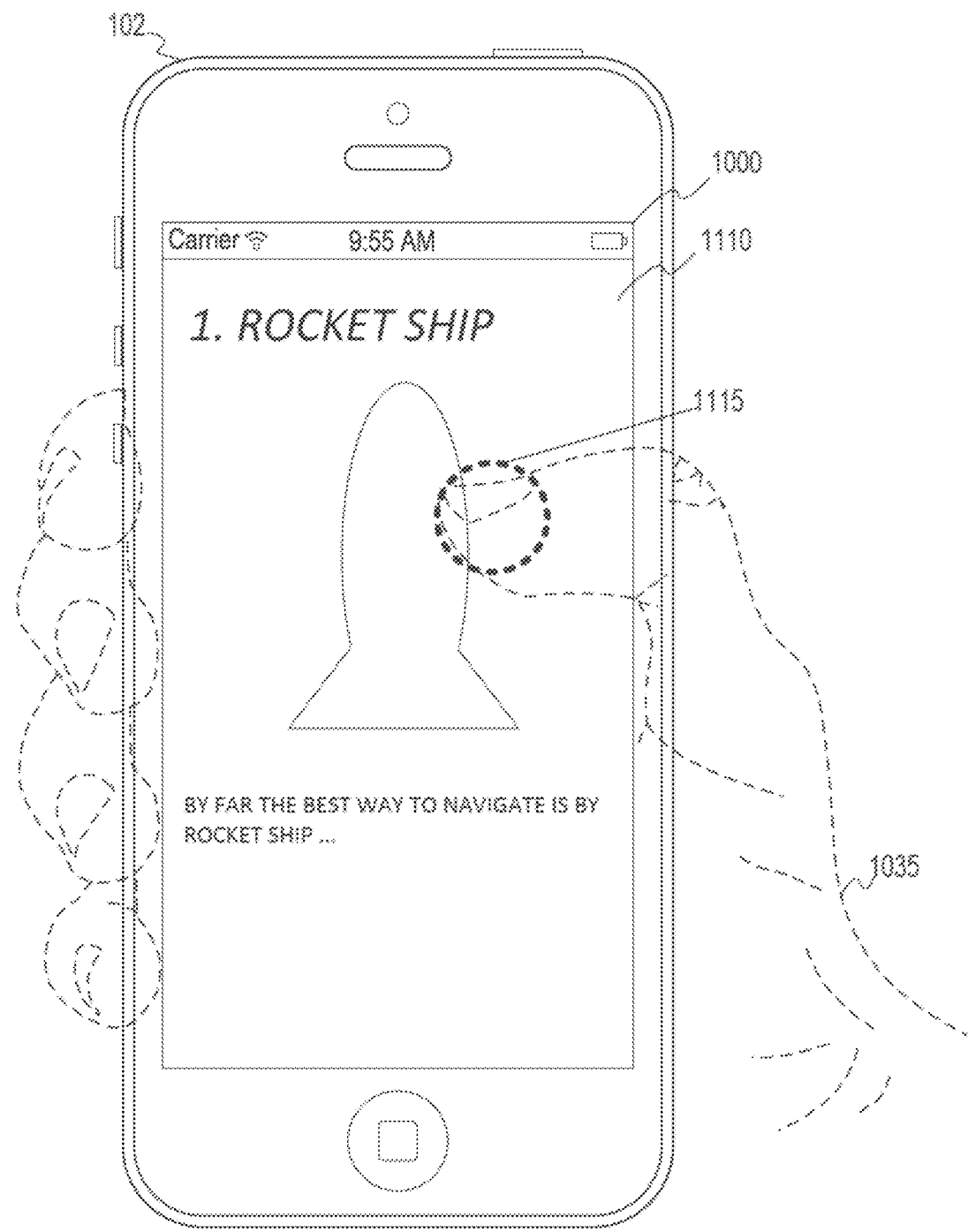

FIG. 11B shows a second page 1110 of the content collection 1015. The user 1035 may read the second page 1110 then navigate to the next page by performing another tap gesture, as indicated by dotted circle 1115.

Figure 11C:
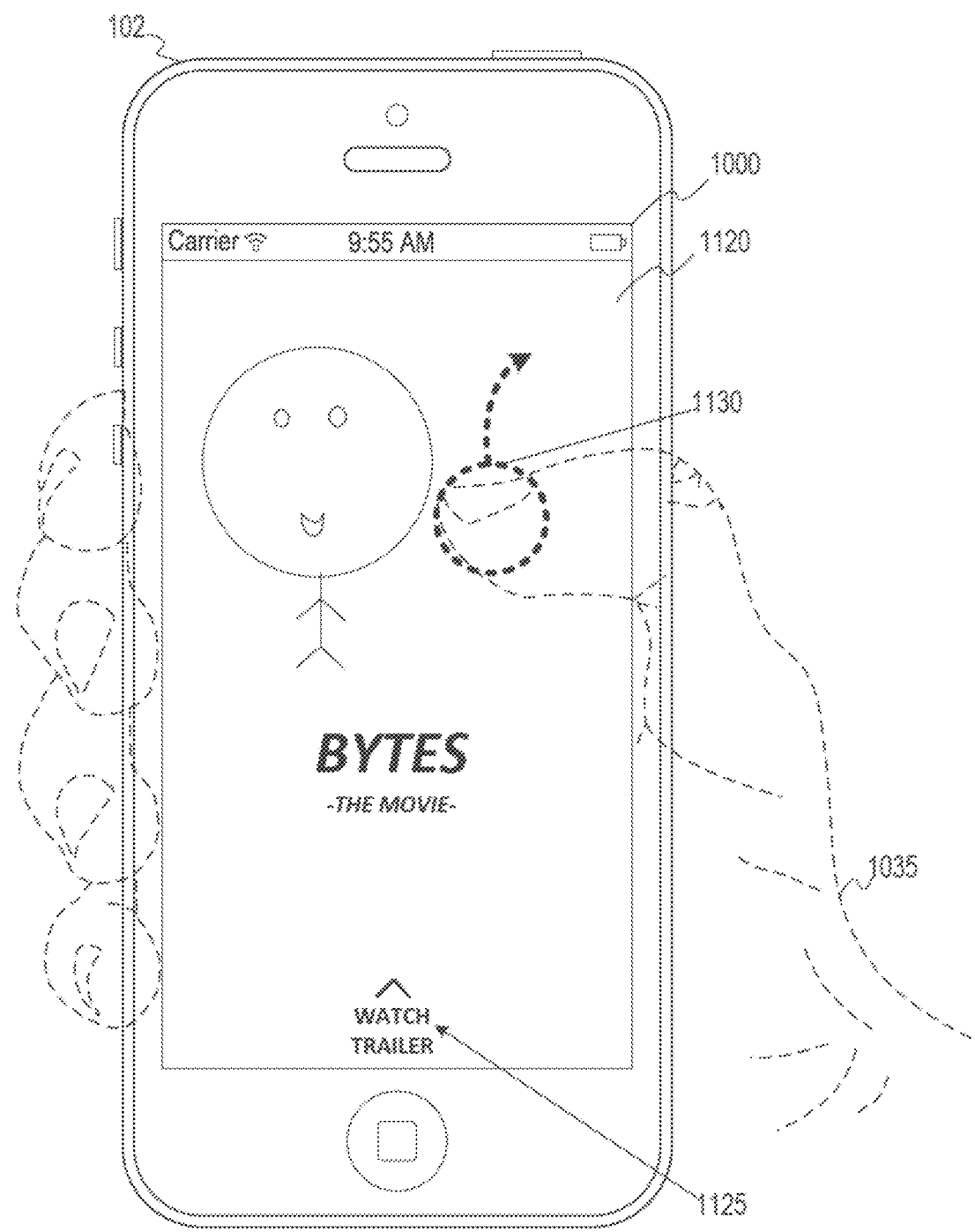

FIG. 11C shows a third page 1120, which is a movie trailer that has been selected from available content using the above processes (e.g., methods 700, 800, and 900). As illustrated, the third page 1120 may be a static image with an instruction 1125 that informs the user 1035 what gesture to perform to select the content. For example, as illustrated, instruction 1125 includes an arrow pointer that conveys to the user 1035 to swipe up to watch the trailer of the example movie "Bytes". If the user 1035 wants to skip the trailer and view the next content item in the content collection, he/she may tap anywhere on the page 1120. If the user wants to watch the trailer, he/she may swipe up as indicated by the dotted circle with an arrow 1130.

Figure 12:
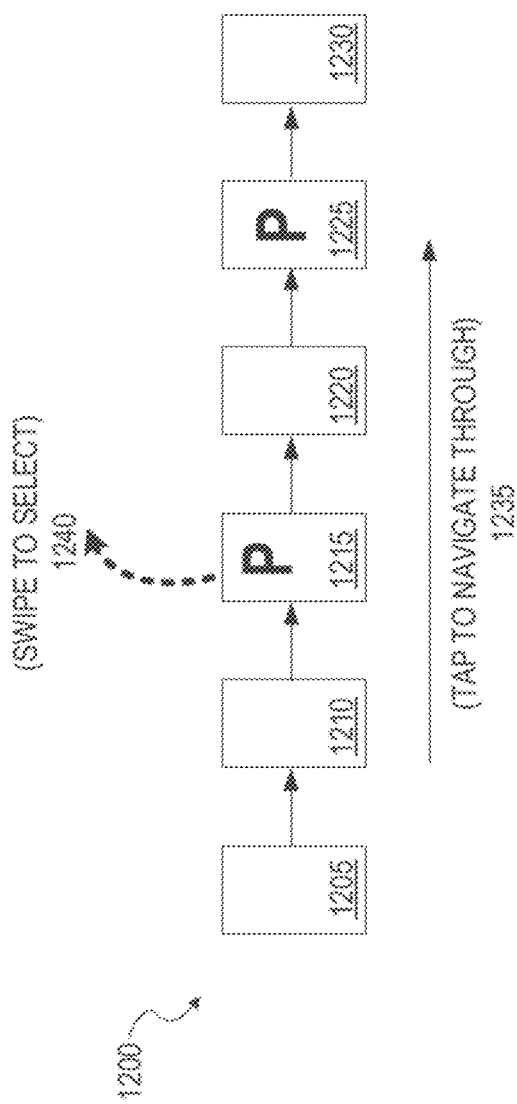
FIG. 12 shows an example collection of content items, according to some example embodiments.

FIG. 12 shows a content collection 1200, according to some example embodiments. The content collection 1200 includes pre-selected content areas 1205, 1210, 1220, 1230, and placeholder areas 1215 and 1225. The pre-selected content areas 1205, 1210, 1220, 1230 may be selected and assembled using the curation interface 208, and the placeholder areas 1215 and 1225 may be kept blank (unused) until a request for the content collection is initiated by a user. When the user requests the content collection 1200, the methods 700, 800, and 900 are performed to select a first item of content to integrate into placeholder area 1215. Next, the second highest ranking content item is integrated into placeholder area 1225. Generally, the user may navigate from one item in the content collection to the next by tapping on the content item as indicated by arrow 1235. If the user is on the placeholder area 1215 (e.g., third page 1120 as shown in FIG. 11C), the user may perform a swipe gesture to select the content (e.g., view the trailer, install an app, etc.) as indicated by arrow 1240.

Software Architecture

Figure 13:
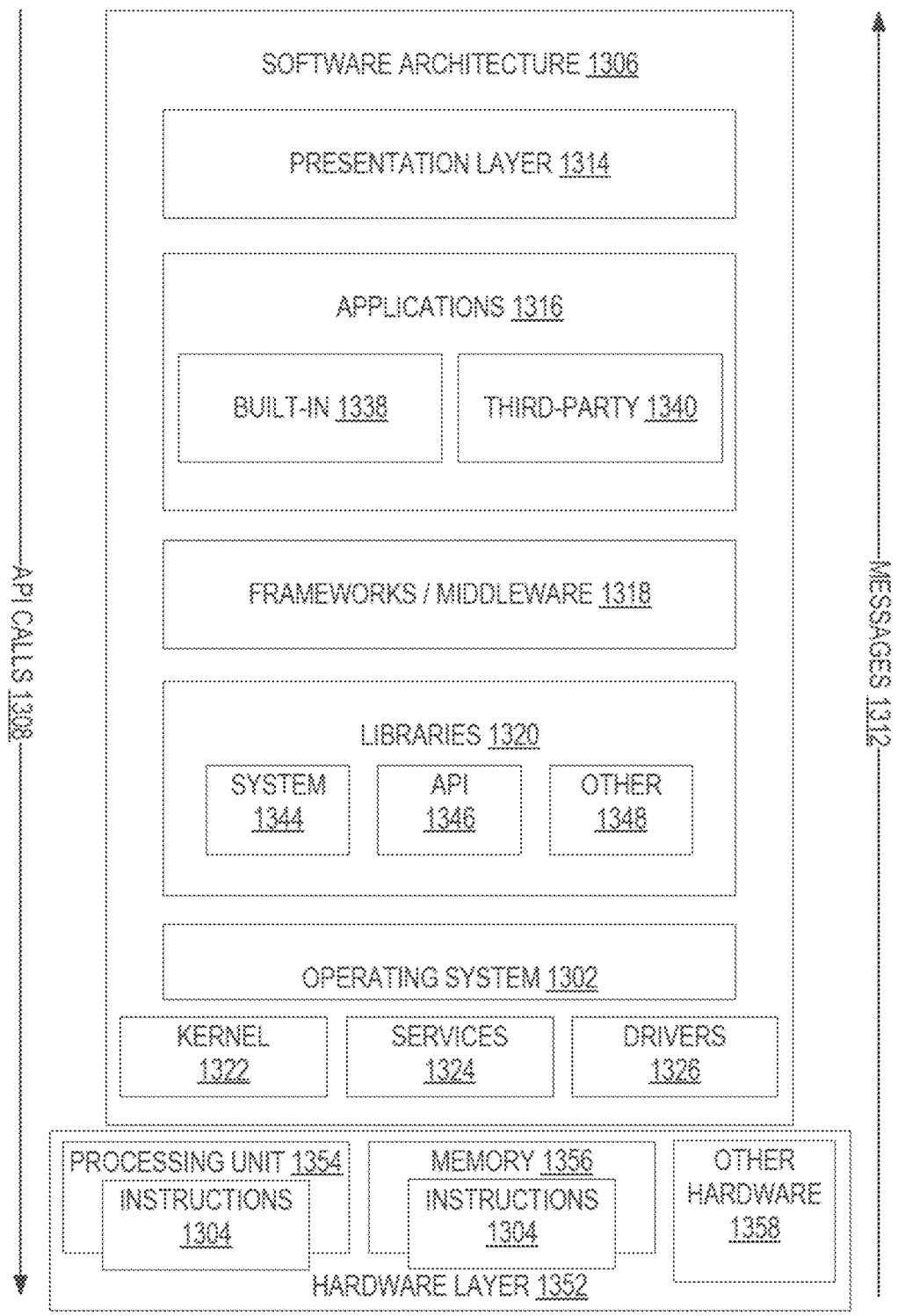
FIG. 13 is a block diagram illustrating a representative software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture 1306, and it will be appreciated that many other architectures may be implemented to facilitate the functionality described herein. The software architecture 1306 may execute on hardware such as machine 1400 of FIG. 14 that includes, among other things, processors 1410, memory/storage 1430, and I/O components 1450. A representative hardware layer 1352 is illustrated and can represent, for example, the machine 1400 of FIG. 14. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316, and a presentation layer 1314. Operationally, the applications 1316 and/or other components within the layers may invoke application programming interface (API) API calls 1308 through the software stack and receive a response as in messages 1312 to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324 and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built-in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
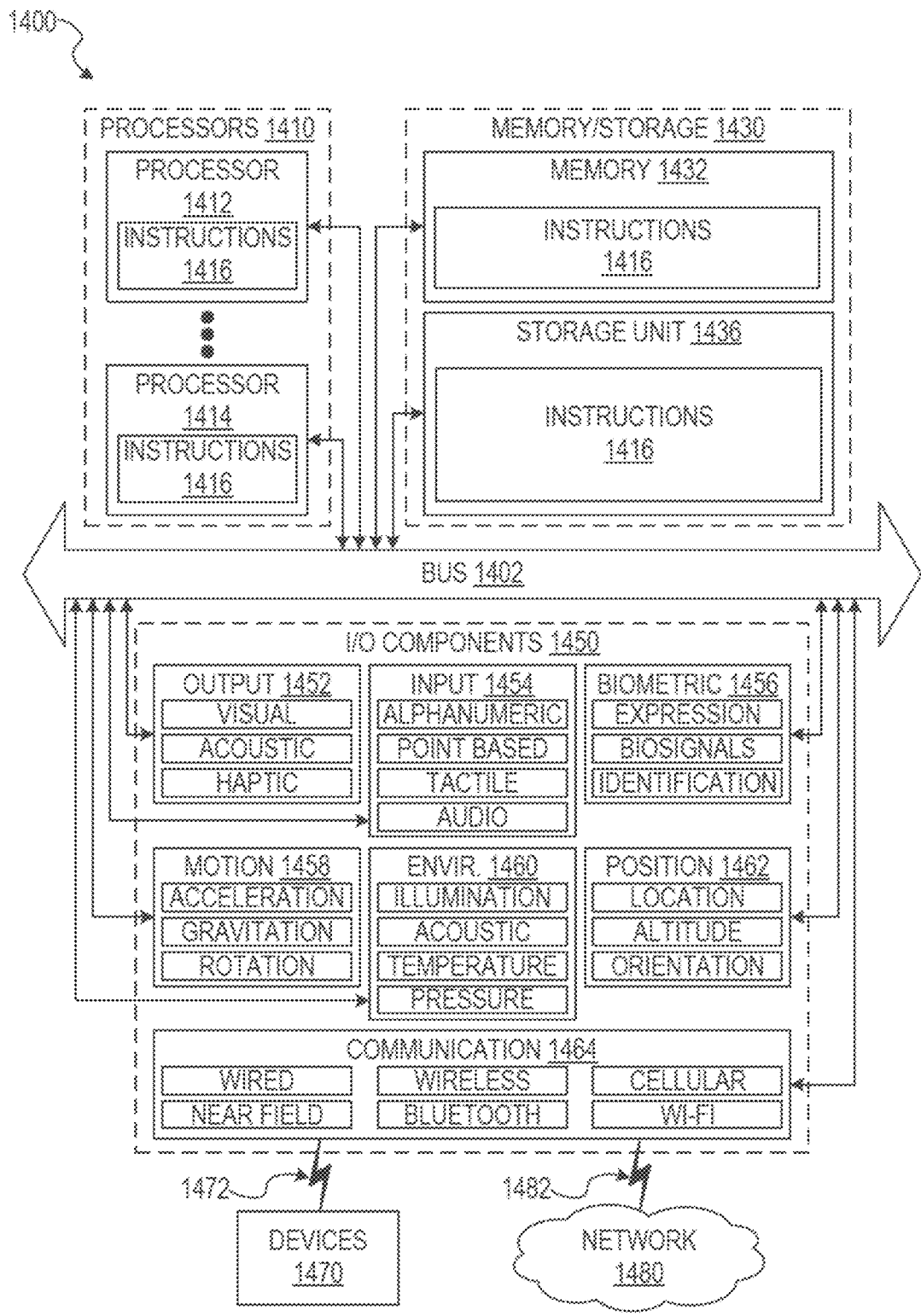
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. As such, the instructions 1416 may be used to implement modules or components described herein. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by machine 1400. Further, while only a single machine 1400 is illustrated, the term "machine" shall also be taken to include a collection of machines that individually or jointly execute the instructions 1416 to perform any one or more of the methodologies discussed herein.

The machine 1400 may include processors 1410, memory memory/storage 1430, and I/O components 1450, which may be configured to communicate with each other such as via a bus 1402. The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of processors 1410 are examples of machine-readable media.

The I/O components 1450 may include a wide variety of components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental environment components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environment components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via coupling 1472 and coupling 1482 respectively. For example, the communication components 1464 may include a network interface component or other suitable device to interface with the network 1480. In further examples, communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC).

A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations.

Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A method comprising:
in response to receiving a content request associated with aggregated content to be presented on a device of a user, identifying a candidate content item, the candidate content item having a bid value;
automatically generating, using a machine learning model, a relevancy value for the candidate content item, the relevancy value indicating whether the candidate content item is likely to be skipped by the user, the relevancy value being associated with a select value and a skip value, the select value indicating a likelihood that the user will select the candidate content item, and the skip value indicating a likelihood that the user will bypass the candidate content item;
generating, for the candidate content item, a combined value by adjusting the bid value for the candidate content item using the relevancy value generated for the candidate content item;
automatically selecting the candidate content item from a plurality of candidate content items based on the combined value generated for the candidate content item;
automatically integrating the candidate content item into at least one placeholder area among one or more pre-selected content items as part of the aggregated content; and
causing presentation of the aggregated content on the device of the user.

2. The method of claim 1, wherein the device of the user generates the content request, and the one or more pre-selected content items are selected prior to the generation of the content request.

3. The method of claim 1, wherein the selection of the candidate content item from the plurality of candidate content items comprises selecting multiple candidate content items from the plurality of candidate content items based on respective combined values generated for the multiple candidate content items, the multiple candidate content items comprise a first content item and a second content item, the at least one placeholder area comprises a first placeholder area and a second placeholder area, and the method further comprises:

detecting that the combined value generated for the first content item is higher than the combined value generated for the second content item; and
in response to detecting that the combined value generated for the first content item is higher than the combined value generated for the second content item, automatically integrating the first content item into the first placeholder area and the second content item into the second placeholder area.

4. The method of claim 3, wherein the first placeholder area is between a first pair of pre-selected content items of the one or more pre-selected content items and the second placeholder area is between a second pair of pre-selected content items of the one or more pre-selected content items.

5. The method of claim 3, wherein the aggregated content comprises an ephemeral message content collection, and the first content item is positioned so as to appear before the second content item in the ephemeral message content collection.

6. The method of claim 1, wherein the aggregated content comprises an ephemeral message content collection.

7. The method of claim 6, wherein the candidate content item is integrated into the ephemeral message content collection for presentation between a first pre-selected content item of the one or more pre-selected content items and a second pre-selected content item of the one or more pre-selected content items.

8. The method of claim 1, wherein adjusting the bid value for the candidate content item comprises automatically boosting or attenuating the bid value based on whether the relevancy value is positive or negative for the candidate content item with respect to the user.

9. The method of claim 1, wherein the content request is generated in response to the user navigating, within an application, to a page configured to receive the aggregated content.

10. The method of claim 9, wherein the generating of the combined value, the selection of the candidate content item, and the integration of the candidate content item are performed while the user is on the page.

11. The method of claim 1, wherein the user is enabled to skip the candidate content item by performing a first device input action through the device, the user is enabled to select the candidate content item by performing a second device input action through the device, and the device is configured to distinguish between the first device input action and the second device input action.

12. The method of claim 11, wherein the selection of the candidate content item from the plurality of candidate content items comprises selecting multiple candidate content items from the plurality of candidate content items based on respective combined values generated for the multiple candidate content items, the aggregated content comprises a content collection in which respective ones of the multiple candidate content items and the one or more pre-selected content items are presented in sequence and navigable by performing the first device input action or the second device input action.

13. The method of claim 11, wherein the first device input action comprises at least one of a tap gesture or a swipe gesture.

14. The method of claim 11, wherein the second device input action at least one of a tap gesture or a swipe gesture.

15. The method of claim 1, wherein causing the presentation of the aggregated content on the device of the user comprises transmitting the aggregated content to the device in response to the content request.

16. The method of claim 1, further comprising storing the aggregated content including the candidate content item.

17. The method of claim 1, wherein the machine learning model implements a random forest scheme.

18. The method of claim 1, wherein the machine learning model comprises an ensemble classifier.

19. A system comprising:
one or more processors of a machine; and
a memory storing instructions that, when executed by the one or more processors, cause the machine to perform operations comprising:
in response to receiving a content request associated with aggregated content to be presented on a device of a user, identifying a candidate content item, the candidate content item having a bid value;
automatically generating, using a machine learning model, a relevancy value for the candidate content item, the relevancy value indicating whether the candidate content item is likely to be skipped by the user, the relevancy value being associated with a select value and a skip value, the select value indicating a likelihood that the user will select the candidate content item, and the skip value indicating a likelihood that the user will bypass the candidate content item;
generating, for the candidate content item, a combined value by adjusting the bid value for the candidate content item using the relevancy value generated for the candidate content item;
automatically selecting the candidate content item from a plurality of candidate content items based on the combined value generated for the candidate content item;
automatically integrating the candidate content item into at least one placeholder area among one or more pre-selected content items as part of the aggregated content; and
causing presentation of the aggregated content on the device of the user.

20. A non-transitory machine-readable storage device embodying instructions that, when executed by at least one machine, cause the at least one machine to perform operations comprising:
in response to receiving a content request associated with aggregated content to be presented on a device of a user, identifying a candidate content item, the candidate content item having a bid value;
automatically generating, using a machine learning model, a relevancy value for the candidate content item, the relevancy value indicating whether the candidate content item is likely to be skipped by the user, the relevancy value being associated with a select value and a skip value, the select value indicating a likelihood that the user will select the candidate content item, and the skip value indicating a likelihood that the user will bypass the candidate content item;
generating, for the candidate content item, a combined value by adjusting the bid value for the candidate content item using the relevancy value generated for the candidate content item;
automatically selecting the candidate content item from a plurality of candidate content items based on the combined value generated for the candidate content item;
automatically integrating the candidate content item into at least one placeholder area among one or more pre-selected content items as part of the aggregated content; and
causing presentation of the aggregated content on the device of the user.

* * * * *